United States Patent [19]

Norman et al.

[11] Patent Number: 5,154,974
[45] Date of Patent: Oct. 13, 1992

[54] ADHESIVE COMPOSITION HAVING IMPROVED CUTTING PROPERTIES

[76] Inventors: Alfred W. Norman, 1586 Stonington Dr., Hudson, Ohio 44236; Carolyn M. Ricci, 5541 Dunham Rd., Maple Heights, Ohio 44134

[21] Appl. No.: 415,421

[22] Filed: Sep. 29, 1989

Related U.S. Application Data

[63] Continuation of Ser. No. 141,948, Jan. 11, 1988, abandoned, which is a continuation of Ser. No. 877,352, Jun. 23, 1986, abandoned.

[51] Int. Cl.$^5$ ............................................. C09J 7/00
[52] U.S. Cl. ................................ 428/355; 428/447; 524/267; 524/269; 524/272; 525/106
[58] Field of Search ............. 524/267, 269, 272; 525/106

[56] References Cited

U.S. PATENT DOCUMENTS 4,151,319 4/1979 Sackoff et al. .
4,346,189 8/1982 Laurent .
4,579,780 4/1986 Shinomiya et al. ................. 428/447

FOREIGN PATENT DOCUMENTS 0126312 11/1984 European Pat. Off. .

Primary Examiner—Jenna L. Davis

[57] ABSTRACT

Adhesives compositions having improved cutting properties described herein. Compositions comprise a normally tacky, pressure sensitive acrylic adhesive containing, as an additive to reduce edge flow, from about 2 to about 10 percent by weight dry basis, preferably from about 5 to about 8 percent by weight dry basis based on the weight of polymer solids, of a polydimethylsiloxane having a number average molecular weight of about 1300 to about 15000. Also disclosed are laminates comprising a facing layer coated on one side with the aforedescribed adhesive composition, and optionally a release liner. These adhesive laminates exhibit substantially reduced tendency of the adhesive to ooze at the edge when cut, without material decrease in other adhesive properties, when a multiplicity of laminate sheets is stacked and cut by means of a guillotine. Laminates herein are especially useful as drum and carton labels.

17 Claims, No Drawings

ADHESIVE COMPOSITION HAVING IMPROVED CUTTING PROPERTIES

This is a continuation of co-pending application Ser. No. 141,948 now abandoned which is a continuation of Ser. No. 877,352 filed on Jun. 23, 1986 now abandoned.

TECHNICAL FIELD

This invention relates to pressure sensitive adhesive compositions and to laminates containing the same. More particularly, this invention relates to novel pressure sensitive adhesive compositions and laminates in which the pressure sensitive adhesive composition exhibits improved cutting properties when a stack of laminates is cut.

BACKGROUND ART

Adhesive laminates including a layer of a normally tacky, pressure sensitive adhesive adhered to at least one surface of a supporting web (or facing layer) are typically cut to size during one or more operations in their manufacture. A plurality of laminate sheets comprising such supporting web (or facing layer) and pressure sensitive adhesive adhered thereto are stacked and cut to the desired size by means of a knife blade, commonly known as a guillotine.

During cutting, pressure sensitive adhesive has the tendency to flow at the cutting edge, either because of its inherent flowability or a combination of that flowability and the exertion of pressure shear force by the cutting blade. As a result of the adhesive flow, the cutting blade tends to become coated with a layer of the adhesive. This coating tends to reduce the efficiency of further shearing cuts, to limit markedly the number of laminate sheets which can be cut with a single stroke of the cutting blade, and to deposit and smear adhesive on the edge surfaces of the articles being cut.

Acrylic polymers are known for their suitability for outdoor uses. Moreover, water based acrylic adhesives (i.e. acrylic emulsion adhesives) are well known. Certain water based acrylic adhesives are permanent adhesives, that is, they have a high ultimate adhesion value for various substrates, so that when such adhesive is used to join a label to a substrate (such as a shipping drum or carton), the label cannot be removed without destroying the label, and frequently there is some damage to the substrate as well. The properties of high outdoor suitability and permanency make permanent acrylic adhesives an ideal candidate for shipping labels. In fact, such acrylic adhesives are used for this purpose. However, adhesive labels are invariably desired in a smaller size than the size of the adhesive laminate sheets as initially prepared. This requires cutting to size. This is done economically by stacking a large number of sheets and cutting with a knife blade or guillotine. The problem that arises is the aforedescribed edge flow, which coats the knife blade, smears the laminate and in a short time renders the cutting operation less efficient.

U.S. Pat. No. 4,346,189 to Laurent describes solvent based pressure sensitive adhesive compositions comprising synthetic rubber, tackifiers and about 6 to 10 percent by weight (based on total dry composition weight) of a silicone additive. The silicone additive is a low molecular weight polysiloxane having a maximum weight average molecular weight of about 11,000. This additive improves properties of the adhesive composition so that virtually no adhesive oozes out at the edge when a stack of laminates containing this composition is cut. The polysiloxane additives successfully solves the problem of edge flow in the synthetic rubber adhesive compositions disclosed therein. However, synthetic rubber adhesives are not suitable for certain purposes, such as labeling of corrugated drums and other shipping cartons, because the adhesive may lack the specific adhesion to corrugated board and fiber drums which is required for shipping labels, may show inadequate ultimate adhesion that is required in a permanent adhesive, and does not provide long term outdoor aging or durability.

Published European Patent Application No. 0 126 312 describes pressure sensitive adhesive compositions and laminates in which improved cutting properties are obtained by adding a polyoxyalkylene polyol such as polyethylene glycol to a mixture which includes a water soluble elastomeric polymer and a tackifier. The solvent base and aqueous emulsion base elastomeric polymers are disclosed; the latter include emulsified acrylic resins. A problem with such adhesive compositions is that polyoxyalkylene glycols are rather hydrophilic so that the resulting adhesive composition is not as water proof as one would desire in an adhesive to be used in shipping carton labels.

U.S. Pat. No. 4,151,319 to Sackoff et al discloses pressure sensitive adhesive compositions and laminates having low "zero minute peel value" (initial adhesion). Among the adhesives disclosed are water based acrylic adhesives containing from about 0.001 to 20 percent by weight (dry basis), preferably from about 0.1 to 1.0 percent by weight, based on polymer solids, of a polysiloxane additive which reduces zero minute peel value. The polysiloxane additive may be either a dimethylsiloxane-oxyalkylene block copolymer, or a more hydrophobic, high molecular weight polysiloxane such as a polydimethylsiloxane. Because of the low initial adhesion or "zero minute peel value" of the adhesive compositions in this patent, it would be necessary to hold a laminate containing such adhesive against a substrate for a while in order to obtain adhesive bonding. This, of course, is unacceptable in adhesives for use as labels, since the user wishes to apply the adhesive label to the substrate as fast as possible and have it stick.

While the problem of edge ooze in solvent based synthetic rubber adhesives has been solved, it has not been solved in water based acylic adhesives. The present invention offers a solution to this problem.

DISCLOSURE OF THE INVENTION

It is an object of this invention to produce a water based acrylic adhesive composition and laminate made therefrom in which the adhesive has improved cutting properties, i.e. a reduced tendency to build up on the knife blade and the freshly cut edge of a stack of laminates when such stack is cut.

It is a related object of this invention to provide a water based acrylic adhesive and laminate made therefrom in which the adhesive has reduced edge flow without substantial impairment of other adhesive properties, such as initial adhesion, ultimate adhesion, and tack.

A particular object of this invention is to provide an adhesive composition and laminate made therefrom in which the adhesive composition has both improved cutting properties and good initial adhesion.

According to one aspect of this invention there are provided novel pressure sensitive adhesive compositions comprising an acrylic polymer and a minor amount, sufficient to improve cutting properties, of a polydimethylsiloxane having a number average molecular weight in the range of about 1300 to about 15,000.

According to another aspect of this invention there are provided novel adhesive sheets or laminates comprising a facing layer coated on at least one surface with a pressure sensitive adhesive composition as described above.

A stack of laminates, according to this invention, can be cut by a guillotine or other cutting instrument with substantially no build-up of the adhesive composition on either the cutting blade or the cutting edge of the laminate stack. Such flow would take place in the absence of the polysiloxane additive.

BEST MODE FOR CARRYING OUT INVENTION

The amount of polysiloxane additive in the adhesive composition is sufficient to reduce materially the amount of adhesive oozing at the edge when one or more laminate sheets containing the adhesive composition as an adhesive layer are cut. Also, the amount of polysiloxane additive is small enough so that there is no material impairment of the adhesive properties of the composition. The amount of polysiloxane (or silicone) additive on the dry or "solids" basis, should be in the range of about 2 percent to about 10 percent, preferably from about 5 percent to about 8 percent by weight, based on the weight of acrylic polymer solids. Stated another way, there should be from about 2 to about 10 pounds, preferably from about 5 pounds to about 8 pounds of dry silicone additive, for every 100 pounds of dry acrylic polymer solids. Silicone additive concentrations below about 2 percent are ineffective, and the greatest improvement in cutting properties is obtained when the concentration of silicone additive is at least 5 percent by weight. Amounts of silicone additive above about 10 percent should be avoided because the adhesive composition dewets rapidly when applied to a web of facing material at higher silicone concentrations. It is preferred to avoid silicone additive concentrations above about 8 percent because adhesive properties, such as initial adhesion or "quick tack" and ultimate adhesion are impaired if the silicone additive concentration is above about 8 percent.

The silicone or polysiloxane additives used in making adhesive compositions of this invention have the general formula

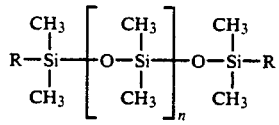

where R is hydroxy or methyl and n is from about 16 to about 200. This corresponds to a number average molecular weight from about 1300 to about 15000. Preferably n is from about 50 to about 150, corresponding to a number average molecular weight from about 4000 to about 11000.

The polysiloxane may be supplied in the form of an aqueous emulsion which contains a surfactant. The surfactant is preferably nonionic. Anionic or cationic surfactants can be used if they are compatible with the surfactant system in the acrylic polymer emulsion. A defoamer may also be present.

The acrylic polymers used in the present compositions are those which are known for their adhesive properties. The preferred acrylic polymers for making labels to be affixed to shipping containers are acrylics which give permanent adhesion. Various other acrylic adhesive polymers giving releasable, (i.e., removable), cold temperature, freezer grade or other special grade of adhesive are known, and these may be used. The acrylic polymer is selected in accordance with the service requirements of the desired product.

The acrylic polymer may be a polymer of one or more lower alkyl acrylates, such as methyl acrylate, ethyl acrylate, butyl acrylate, isobutyl acrylate, and 2-ethylhexyl acrylate. Alternatively, the acrylic polymer may be a copolymer of one or more of the above acrylates or methacrylates with a minor amount, up to about 20 percent by weight and preferably no more than about 10 percent by weight, of vinyl acetate or other comonomer which does not materially affect the adhesive properties of the resulting polymer. Small amounts of cross-linking monomers, e.g. not over about 5 percent by weight of total polymer and preferably not over about 3 percent by weight, may be present. One class of cross-linking monomers are those which have reactive sites other than the double bond, as for example acrylic acid, methacrylic acid and acrylamide. Another class of cross-linking agents are compounds having two double bonds per molecule, as for example divinylbenzene and dienes such as 1,4-butadiene. A limited extent of cross-linking, either through double bonds (as with divinylbenzene, for example) or through reactive sites such as the carboxyl group (as in acrylic acid, for example) is acceptable and may even improve certain adhesive properties including tack. However, extensive cross-linking impairs tack and other adhesive properties and should therefore be avoided.

The acrylic polymers used in the practice of this invention are dispersible in water but are not water soluble. These polymers are water based, that is, they are supplied in the form of an aqueous dispersion and in particular an aqueous emulsion. A surfactant is usually required in order to form a stable emulsion.

Other ingredients, such as tackifiers, fillers and pigments, may be included in minor amounts in the adhesive compositions of this invention, but ordinarily are not necessary.

Adhesive compositions of this invention may be in the form of aqueous dispersions and in particular aqueous emulsions which may be attained by mixing the aforedescribed acrylic polymer and polysiloxane emulsions. They may also be in the form of dry, normally tacky, pressure sensitive mixtures of non-volatile components (i.e. the non-volatile components of the aqueous emulsions).

The acrylic polymer and the polysiloxane must be compatible. Compatibility of the acrylic polymer emulsion and the polysiloxane emulsion can be determined readily in two ways, i.e. by mixing the two emulsions and by forming a dry adhesive film from the emulsions. If separation occurs immediately upon mixing of the two emulsions, the ingredients are incompatible. When a dry adhesive film is formed from the two emulsions by conventional techniques, the ingredients of the two emulsions are incompatible if marked pin-holing occurs, or if there is significant dewetting of the polysiloxane, which will result in a visibly non-homogeneous film. Conversely, if pin-holing is minor or nonexistent and if no dewetting occurs, the acrylic polymer and the polysiloxane are compatible.

Compatibility of the acrylic polymer and the polysiloxane is affected by the ratio of polysiloxane emulsion to acrylic polmer emulsion, by the molecular weight of the polysiloxane, and by the surfactants in each emulsion. Thus, the preferred polysiloxanes indicated above are incompatible with the preferred acrylic polymer emulsions when the amount of polysiloxane on a solids-to-solids basis exceeds about 10% by weight (dry) of polysiloxane based on acrylic polymer solids. Incompatibility also results with polysiloxanes of higher molecular weight than the maximum specified herein (for example the polysiloxanes of the Sackoff et al patent which are not oxyalkylene adducts). Incompatibility may also result because of interaction between either the acrylic polymer solids or the surfactant in the acrylic polymer emulsion with the surfactant in the polysiloxane emulsion. For example, the two emulsions will obviously be incompatible if one has a cationic surfactant and the other has an anionic surfactant. Incompatibility between the acrylic polymer and the surfactant in the polysiloxane emulsion cannot always be anticipated in advance of actual mixing; however, surfactant incompatibility is unlikely to result when the polysiloxane emulsion has a nonionic surfactant, and is much more likely to result when the polysiloxane emulsion has an anionic surfactant.

Conventional coating, drying and laminating techniques, and conventional facing layer and release liner materials may be used in preparing adhesive laminates of this invention. For example, an adhesive laminate may be formed by reverse coating, i.e., by first applying a mixed aqueous emulsion containing both adhesive acrylic polymer and polysiloxane to a silicone-coated surface of a release liner web, oven drying the aqueous emulsion to evaporate the water, and then laminating the resulting adhesive film to a facing layer web. The mixed aqueous emulsion may be formed either just before use or up to a few hours to about one day ahead of time. Curing takes place simultaneously with drying if any cross-linking agent is present. Upon application of the facing layer, the dried adhesive film is transferred to the facing layer, since it adheres more strongly to the facing layer than to the silicone coated release liner. The release liner may be peeled off if desired after the film has been transferred to the facing layer.

The other general method which may be used is the direct coating method. In this method, a mixed emulsion of adhesive polymer and polysiloxane is applied directly to one surface of a facing layer, and the resulting laminate dried. A release liner may be applied to cover and protect the adhesive layer if desired. Both general methods are described, for example, in U.S. Pat. No. 4,151,319 to Sackoff et al.

Facing layer and release liner materials, methods of forming laminates and suitable adhesive film thicknesses are all well know in the art. For example, both the facing layer and the release liner may be in the form of continuously moving webs, which are cut into sheets of desired length where desired after the desired laminate has been formed. When labels are desired, the sheets must be further cut to desired label size. All cutting operations may be performed by a guillotine or other device having a knife blade surface. As indicated previously, a large number of laminate sheets, sometimes up to 400 sheets, are stacked together for cutting the sheets into labels.

When the end product is an adhesive label, the non-coated surface of the facing layer must be capable of accepting writing (e.g. a ballpoint pen or pencil) and is preferably capable also of accepting printing, without harm or distortion of the laminate as a whole. Paper is a preferred facing material when labels constitute the desired end use. Other suitable facing layer materials include, for example, polyester, and polyvinyl chloride films.

Labels prepared according to this invention may include a facing layer coated on one side only with an adhesive composition according to the present invention, and a release liner covering the side of the adhesive film which is not in contact with the facing layer. Labels made according to this invention may be applied in the usual manner, e.g. by peeling off the release layer at the time of use and applying the exposed adhesive surface to the substrate. The substrate is typically a shipping carton or drum, or an article which is being shipped.

A major advantage of adhesive compositions of this invention and laminates made therefrom is that a large number of laminate sheets may be stacked together and cut simultaneously, by a guillotine or other knife blade instrument, with little if any build-up of the adhesive composition on either the cutting blade or the cutting edge of the laminate stock. Because of the greatly improved cutting properties, more laminate sheets can be cut simultaneously than is the case with previously known adhesive laminates. The cutting edge either does not become coated with adhesive or becomes coated only after a long time in service, so that frequent shutdowns for cleaning, which were necessary with prior art adhesive compositions and laminates, are not necessary with the adhesive compositions and laminates of this invention. Also, edges of laminate sheets of the present invention look clean and neat, and do not have a messy appearance as a result of adhesive flowing to the edge, collecting on the knife blade, then being transferred from the knife blade to the edge of the cut laminate. Furthermore, the reduced edge flow in adhesive compositions of this invention is accomplished without substantial impairment of other adhesive properties. Thus, the adhesive composition of this invention has sufficient initial adhesion (which is measurable by either "quick tack" or "zero minute peel value" tests) so that an adhesive label may be applied rapidly by hand to a substrate without the use of a roller or other compression-applying device and the label will stick. Adhesion after periodic intervals, e.g. 30 minute, 60 minutes, etc., after application has been found to be good in laboratory tests. Ultimate adhesion of the label to the substrate is also quite good. Thus, when a permanent acrylic adhesive is used, the label cannot be peeled off without destroying the label and in some cases without damaging the substrate also. When a releasable acrylic adhesive is used, the label will stick to the substrate until peeled off, and will not fall off spontaneously. Thus, adhesive compositions and laminates of this invention have acceptable adhesive properties generally, in addition to the improved cutting properties.

This invention will now be described further with reference to preferred embodiments thereof as illustrated in the following examples.

All amounts in the examples which follow are in parts by weight of additive, on the dry basis, per 100 parts of acrylic polymer solids.

EXAMPLE 1

Acrylic polymer emulsions having the compositions listed in Table I below were prepared. Amounts are in parts by weight dry basis. These emulsions are designated as formulations A, B, E, F and Control. Viscosities (in centipoises) of the emulsions were measured at room temperature, using a "Brookfield Model RVT Viscosimeter" with a No. 4 spindle at a speed of 20 rpm. The surface tension of each emulsion was also measured. Viscosities and surface tensions are also shown in Table I.

The acrylic polymer was a commercial permanent adhesive grade acrylic polymer emulsion containing 52 percent by weight solids. The polymer is believed to consist of 95 percent by weight isobutyl acrylate and 5 percent by weight n-butyl acrylate.

The defoamer was a commercial defoaming agent.

Silicones sold by two different vendors were used. The first ("Silicone No. 1") was a 35 percent (by weight) aqueous emulsion of polydimethysiloxane having a number average molecular weight of about 10,000 and a viscosity of about 350 centistokes at 25° C., and containing a nonionic surfactant. Formulations A and B, having the compositions shown in Table I, were prepared from Silicone No. 1. The second ("Silicone No. 2") was a 50 percent (by weight) aqueous emulsion of polydimethylsiloxane, having a number average molecular weight of about 8000 and containing a nonionic surfactant. Formulations E and F (See Table I) were prepared from Silicone No. 2. Both were substantially free (not more than 25 ppm) of phenyl and vinyl groups, and both had trimethylsilyl chain terminating groups. Experimental data indicate that these two silicones can be used interchangeably with no perceptible differences in properties of the resulting dry adhesive compositions.

Emulsion A exhibited a moderate amount of dewetting, as indicated by formation of small circular void areas of no adhesive coating, (i.e. pinholes).

A laminate web comprising a 60 lb. "ClS" litho paper facing layers, a dried adhesive film, and an 80 lb. white Kraft paper sheet coated on one side with a silicone release material as the backing layer, was prepared from each of the emulsions given in Table I. Coating weights, in grams per 100 square inches, are also given in Table I. The web was cut into sheets (17"×22"), which were further cut into smaller sheets and strips as required for testing.

Two additional acrylic polymer emulsions (Formulations C and D) containing 5 percent (wt.) of a third polydimethylsiloxane additive ("Silicone No. 3"), having a number average molecular weight of about 75,000 and emulsified with an anionic surfactant, were prepared and coated in the same manner as the emulsions described above. Immediate dewetting occurred. This was evident from the appearance of large pinholes in the coating layer. Addition of 0.5 percent of a surfactant did not remedy the problem. These runs were not processed further.

Adhesive properties of the laminates were measured according to uniform test procedures. Results are shown in Table I.

Quick tack, which is a measure of the initial adhesion (i.e. adhesiveness when first applied) of an adhesive strip to a substrate, was measured with an Instron tensile testing machine as follows: A 1"×5" strip of the laminate being tested, with the backing removed, with the adhesive coated surface on the outside, was formed into a teardrop shaped loop. The ends of the loop were clamped into the jaws of the testing machine. A stainless steel panel was placed in the panel holder of the machine beneath the test strip. The test strip was positioned initially so that the bottom of the loop just touched the panel. The panel and panel holder were then raised until a one square inch (1"×1") portion of the adhesive layer was in contact with the panel. The test strip and the panel were then pulled apart at a speed of 12 inches per minute, and the force required (in pounds) was measured with a load cell.

Thirty minute peel value was determined as follows:

Adhesive laminate samples were cut into test strips one inch wide and conditioned for 24 hours at 72° F. and 50 percent relative humidity. The test strips were then applied to a stainless steel substrate with a 4.5 lb. PSTC roller. After remaining adhered to the substrate for 30 minutes at room temperature, the strip was peeled back at an angle of 180° (i.e., it was pulled back on itself in a direction parallel to the surface of the stainless steel substrate plate) and at a rate of 12 inches per minute. The force in grams required to peel back each strip was measured. Results represent the average of either 3 or 5 test strips. Results are shown in Table I.

The plasticity of each dry adhesive was measured by means of a Williams plastometer. A sample of each dry adhesive composition was formed into a small ball of prescribed weight. Each ball was placed between two parallel plates of the plastometer so that the two plates just touched the ball without compressing it. Then the two plates were moved toward each other under uniform test conditions for a predetermined length of time. The distance moved (in millimeters) was recorded as the Williams plasticity value. Results are shown in Table I.

Laminate sheets (including a release layer), prepared according to this example were stacked into stacks of either 100 or 300 sheets, and were cut with a power driven guillotine which had a knife blade that cut at right angles to the sheet. The force of the cut was the same in all runs in this example. A single cut of each stack was made. Some cuts were made in the cross direction (CD), others were made in the machine direction (MD). Both the knife blade and the stack of laminate sheets were examined for the presence of adhesive after each cut. Each cut was rated on a scale of 1 to 10, 10 being the best. Ratings are assigned by feeling the cut edge of the stack with a finger to determine the degree of tack (if any), and by rubbing the cut edge of the stack with a finger to determine whether or not any adhesive rubs off, and if so, approximately how much. The rating scale was as follows:

| Rating | Feel | Rub-off |
|---|---|---|
| 10 | No Tack | None |
| 9 | Very slight tack | None |
| 8 | Slight tack | Slight |
| 7 | Moderate tack | Moderate |
| 6 | Pronounced tack | Heavy |

Ratings are shown in Table I.

TABLE I

| | A. Formulations | | | | |
|---|---|---|---|---|---|
| Formulation | Control | A | B | E | F |
| Acrylic polymer | 100 | 100 | 100 | 100 | 100 |
| Defoamer | 0.5 | 0.5 | 0.5 | 0.5 | 0.5 |
| Silicone No. 1 | — | 8.0 | 5.0 | — | — |

TABLE I-continued

| | | | | | |
|---|---|---|---|---|---|
| Silicone No. 2 | — | — | — | 8.0 | 5.0 |
| Viscosity (cps) | 1550 | 220 | 510 | 970 | 1120 |
| Percent Total Solids | 52.0 | 50.9 | 51.5 | 47.0 | 52.3 |
| Surface Tension (dynes/cm) | 38.2 | 34.9 | 32.8 | 32.3 | 34.5 |

B. Adhesion and Guillotining Performance

| Run No. | | Control | A | B | E | F |
|---|---|---|---|---|---|---|
| Coat wt. (g/100 in$^2$) | | 1.70 | 1.65 | 1.70 | 1.60 | 1.50 |
| Quick Tack (lb.) | | 3.44 | 3.64 | 5.68 | 3.64 | 4.40 |
| 30 Min. Peel (lb/in.) | | 3.13 | 3.13 | 3.17 | 3.80 | 3.00 |
| Williams Plasticity (mm) | | 1.950 | 1.855 | 1.910 | 1.705 | 1.651 |
| Guillotine Quality Rating: | | | | | | |
| 100 sheets | CD | 7 | 9-10 | 8-9 | 9 | 9 |
| | MD | 7 | 8-9 | 9-10 | 9 | 9 |
| 300 sheets | CD | 7 | 9-10 | 8-9 | 9 | 9 |
| | MD | 7 | 9 | 9-10 | 10 | 10 |

In the quick tack test reported in Table I, thin streaks or "legs" of adhesive were observed in Runs A and B, and delamination of the paper facing layer was observed in Run F.

Two controls, both production samples, were used in guillotining evaluation as an aid in maintaining uniformity of ratings. The first was a laminate having a solvent-based styrene-butadiene rubber (SBR) adhesive, made according to Laurent U.S. Pat. No. 4,346,189. The second was a laminate having the same acrylic adhesive as that used in the examples herein, but with no polysiloxane additive. Guillotining quality ratings of these materials are shown in Table II below.

TABLE II

| Adhesive | 100 Sheets | 300 Sheets |
|---|---|---|
| SBR | 10 | 10 |
| Acrylic | 8 | 8 |

Adhesion of each of the adhesives shown in Table I to various substrates was tested. Adhesive laminate sheets prepared in each run were cut into test strips. The release liner of each test strip was pulled off. The adhesive layer was applied to the substrate by hand at room temperature, and the test strip was peeled off (or an attempt to peel it off was made) one hour later. Both the control adhesive and the test adhesives (Runs A, B, E and F) adhered well to corrugated boxboard, a fiber drum, a plastic can, and to stainless steel and glass, and could not be removed. Delamination of the corrugated box and the fiber drum occurred on removal of the test strips. Both control and invention adhesive test strips could be removed with some difficulty from low density polyethylene and polypropylene films.

EXAMPLE 2

Aqueous acrylic polymer emulsions, containing 5 percent by weight (dry basis) of a polydimethylsiloxane additive and having the same compositions as those prepared in Runs B and F of Example 1, were prepared. Also prepared was a control acrylic polymer emulsion, containing no silicone additive and having the same composition as the control emulsion of Example 1.

Adhesive laminate webs and sheets were prepared as described in Example 1. Facing and backing materials were the same as those described in Example 1. Physical tests of laminate samples were carried out as described in Example 1. Results are given in Table III below.

TABLE III

| Run | B | F |
|---|---|---|
| Coat wt. (g/100 in$^2$) | 1.50 | 1.40 |
| Quick Tack (lb) | 4.18 | 3.84 |
| 30 min. peel (lb./in) | 4.78 | 5.07 |
| Guillotine quality rating: | | |
| 100 sheets | 9-10 | 9-10 |
| 300 sheets | 9-10 | 9-10 |

In Table III, coat weight, quick tack and 30 minute peel values are the average of two samples.

For comparison purposes, the guillotine quality ratings of 100-sheet and 300-sheet stacks of laminates made previously, having the same acrylic adhesive, facing material and backing material as the test laminates described in this example except that they contained no silicone additive, were 7-8.

EXAMPLE 3

Aqueous emulsions of acrylic polymer and polydimethylsiloxane, having the compositions given in Table IV, were prepared. The acrylic polymer, defoamer, and "Silicone No. 2" were the same materials as those described in Example 1. Viscosities were determined as in Example 1, and results are given in Table IV.

TABLE IV

| Formulation | Control | A | B | C |
|---|---|---|---|---|
| Formulation | | | | |
| Acrylic polymer | 100 | 100 | 100 | 100 |
| Defoamer | 0.5 | 0.5 | 0.5 | 0.5 |
| Silicone No. 2 | — | 8 | 5 | 2 |
| Viscosity | 1550 | 800 | 1450 | 1200 |
| Physical Testing | | | | |
| Coat wgt. (g/100 sq. in.) | 1.710 | 1.680 | 1.935 | 1.704 |
| Quick Tack (lb.) | 4.40 | 3.38 | 3.40 | 2.24 |
| 30 Min., Peel (lb/in) | 3.37 | 4.87 | 4.83 | 5.23 |

Laminates were prepared, and physical tests were carried out as in Example 1. Results are shown in Table IV.

Stacks of laminates prepared from adhesive compositions A, B and C of this example were guillotined as described in Example 1. Little build-up of adhesive on the cut edges was found. Significantly greater adhesive build-up was observed in a control laminate sample having the same facing material, back material and acrylic polymer as the test laminates described in this example but containing no silicone additive.

While in accordance with the patent statutes, a preferred embodiment and best mode has been presented, the scope of the invention is not limited thereto, but rather is measured by the scope of the attached claims.

What is claimed is:

1. A water emulsion pressure sensitive adhesive exhibiting quick tack and 30 minute peel adhesion sufficient to adhere to a fiber or corrugated container and freedom from adhesive edge flow and undesired slippage comprising:
    (a) a water dispersible pressure sensitive adhesive acrylic polymer;
    (b) a first surfactant system having at least one surfactant adapted to stabilize a dispersion of said acrylic polymer being selected from the class consisting of cationic, anionic and nonionic surfactants;

(c) an emulsifiable polydimethylsiloxane in an amount of from about 2 to about 10 percent by weight on the dry basis, based on the weight of acrylic polymer solids, said polydimethylsiloxane having a number average molecular weight in the range of about 1,300 to about 15,000;

(d) a second surfactant system having at least one surfactant adapted to stabilize an emulsion of said polydimethylsiloxane and being selected from the class consisting of cationic, anionic and nonionic surfactants; and (e) water;

wherein the polydimethylsiloxane is compatible with the acrylic polymer and the surfactant systems, said adhesive emulsion, when coated onto a facing layer and dried, forming a normally tacky essentially pinhole free adhesive film having reduced tendency to flow when cut and about the same quick tack adhesion as the same acrylate adhesive film in which the polydimethylsiloxane is absent.

2. An adhesive emulsion according to claim 1 in which said polydimethylsiloxane has a number average molecular weight in the range of about 4,000 to about 11,000.

3. An adhesive emulsion according to claim 1 in which said polydimethylsiloxane has the formula

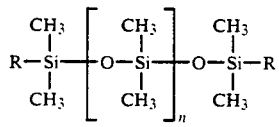

where R is a methyl or a hydroxyl radical and n is from about 11 to about 200.

4. An adhesive emulsion according to claim 3 in which n is from about 50 to about 150.

5. An adhesive emulsion according to claim 1 in which the amount of said polydimethylsiloxane is from about 5 to about 8 percent by weight on the dry basis, based on the weight of polymer solids.

6. An adhesive emulsion according to claim 1 in which said acrylic polymer is not water soluble.

7. An adhesive emulsion according to claim 1 in which said acrylic polymer on drying gives a permanent adhesive.

8. An adhesive laminate comprising a facing layer having a dry normally tacky pressure sensitive acrylic adhesive coating on at least one surface thereof, said coating comprising a water dispersible pressure sensitive adhesive acrylic polymer, a first surfactant system to stabilize a dispersion of said polymer, an emulsifiable polydimethylsiloxane in an amount of from about 2 to about 10 percent by weight on the dry basis, based on the weight of acrylic polymer solids which is compatible with said adhesive acrylic polymer and which has a number average molecular weight in the range of about 1,300 to about 15,000, and a second surfactant system to stabilize an emulsion of said polydimethylsiloxane, said coating having a reduced tendency to flow when cut and about the same initial peel adhesion as the same acrylic adhesive coating in which said polydimethylsiloxane is absent, wherein the polydimethylsiloxane is compatible with the acrylic polymer and the surfactant systems and said first and second surfactants being selected from the class of cationic, anionic nonionic surfactants.

9. A laminate according to claim 8 in which said polydimethylsiloxane has a number average molecular weight in the range of about 4,000 to about 11,000.

10. A laminate according to claim 8 in which said polydimethylsiloxane has the formula

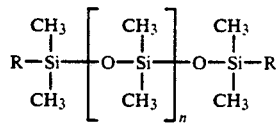

where R is a methyl or a hydroxyl radical and n is from about 11 to about 200.

11. A laminate according to claim 10 in which n is from about 50 to about 150.

12. A laminate according to claim 8 in which said acrylic polymer is a permanent adhesive.

13. A laminate according to claim 8 in which said first surfactant systems comprises at least one surfactant.

14. A laminate according to claim 8 in which said second surfactant systems comprises at least one surfactant.

15. A dry, normally tacky adhesive film derived from an aqueous emulsion that exhibits quick tack and 30 minute peel adhesion sufficient to adhere to a fiber drum and freedom from adhesive edge flow, said film comprising:

(a) a water dispersible pressure sensitive acrylic polymer which is water insoluble;

(b) a first surfactant system having at least one surfactant adapted to stabilize the dispersion of said polymer;

(c) an emulsifiable polydimethylsiloxane in an amount of from about 2 to about 10 percent by weight on the dry basis, based on the weight of acrylic polymer solids which is compatible with said acrylic polymer, said polydimethylsiloxane having a number average molecular weight in the range from about 1,300 to about 15,000; and (d) a second surfactant system having at least one surfactant to stabilize the emulsion of said polydimethylsiloxane which is compatible with said first surfactant system said surfactants being selected from the class of cationic, anionic and nonionic surfactants;

wherein the polydimethylsiloxane is compatible with the acrylic polymer and the surfactant systems; and said film having reduced tendency to flow when cut and about the same initial adhesion and 30 minute peel adhesion as the same acrylate adhesive film in which said polydimethylsiloxane is absent.

16. A film according to claim 15 in which said film is deposited as a substantially homogeneous coating on at least one surface of a facing layer.

17. A film according to claim 15 in which said film is adhered to a facing layer.